Patented July 15, 1952

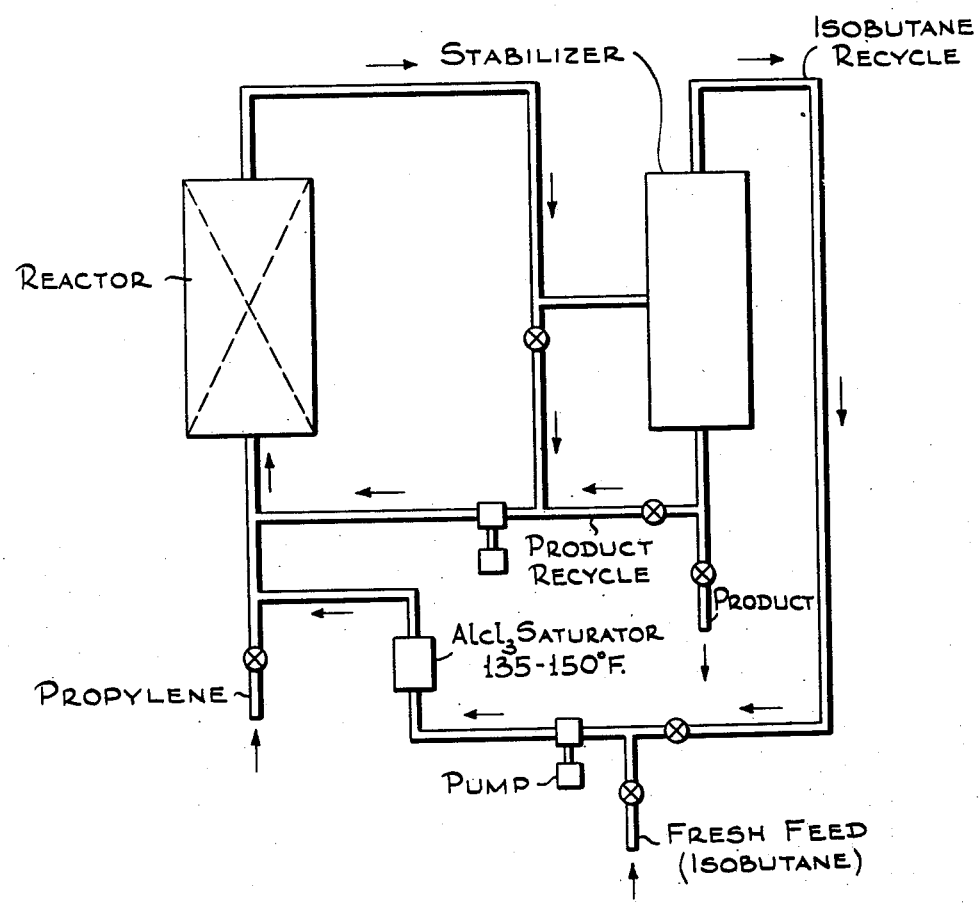

2,603,666

UNITED STATES PATENT OFFICE 2,603,666

CATALYTIC REACTION OF ISOBUTANE AND PROPYLENE TO PRODUCE LUBRICATING OIL

Robert J. Fritz, Baton Rouge, La., assignor to Standard Oil Development Company, a corporation of Delaware Application September 21, 1950, Serial No. 186,088

6 Claims. (Cl. 260—683.15)

This invention relates to the production of a synthetic hydrocarbon lubricating oil by the catalytic treatment of a mixture of propylene and isobutane.

This is a continuation-in-part of application Serial Number 719,697, filed January 2, 1947, and now abandoned.

It is well known that hydrocarbon oils of the lubricating oil range can be produced by the catalytic polymerization of low molecular weight olefins. An investigation of the properties of products obtained by the polymerization of pure olefins of the $C_2$ to $C_{16}$ range, using aluminum chloride as the catalyst, was reported in the article by Sullivan, Voorhees, Neely and Shankland in "Industrial & Engineering Chemistry," vol. 23, pp. 604–611 (1931). The highest viscosity obtained among the series of products was a viscosity of 201 seconds Saybolt at 210° F. in the case of polymer of cetene. The viscosity index of such products varied over a wide range and was generally quite low. The polymer of propylene, having a viscosity of 70 seconds at 210° F., exhibited a viscosity index of only 20.

It has been found, in accordance with the present invention, that a product of considerably higher viscosity than that generally obtainable in the simple polymerization of olefins and having a very low Conradson carbon value and high flash point may be obtained by the treatment of a mixture of isobutane and propylene with aluminum chloride under conditions whereby a large proportion of the normally liquid product is recycled through the reactor in contact with the catalyst. The product may, therefore, be considered to be a good synthetic bright stock. The exact nature of the reaction which takes place is not known, but it is believed that the product consists largely of a polymer of propylene, modified in some manner by the presence of the isobutane in the reactor, whereby the degree of unsaturation is reduced and the product made more stable.

The process of this invention is carried out in a continuous manner by mixing isobutane and propylene in the ratio of 4 to 6 molecular proportions of the former to 1 molecular proportion of the latter, and this mixture is passed into a suitable reactor while maintaining a reaction temperature of about 60 to 90° F. and under a pressure sufficient to maintain a liquid phase reaction. The aluminum chloride catalyst may be simply dissolved in the liquid reactants or deposited on a suitable carrier, such as silica gel, activated alumina, Porocel, diatomaceous earth, and the like, or it may be employed as an aluminum chloride-hydrocarbon complex commonly known as sludge. At the same time a portion of the total normally liquid product, either with or without the presence of unreacted isobutane, is continuously recycled to the reactor and is normally recirculated to the line containing fresh feed. The proportion of the product which is recycled is such that the volume ratio of the recycled product to the incoming fresh feed mixture is 4 to 6 volumes of the former, preferably about 5 volumes, to 1 volume of the latter. The rate at which the mixture of fresh feed and recycle stock is introduced into the reactor is such that the contact time for a single pass is from 5 to 15 minutes. The contact time is not critical as to its upper limit, since an increase in time will merely tend to make the product more viscous. The unreacted isobutane and other light products which are not desired in the final product may be removed by distillation as required.

In the accompanying drawing there is shown an apparatus particularly suitable for conducting the process of the present invention. A fresh supply of isobutane in liquid form is mixed with any recycle isobutane available for use and passed through a pump into an aluminum chloride saturator, which is a vessel containing aluminum chloride in powdered form and maintained at a temperature preferably of the order of 125 to 150° F., while the liquid absorbs as much as possible of the aluminum chloride. The isobutane is subsequently blended with a supply of liquid propylene and with the recycled liquid products and then introduced into a soaking drum or reactor maintained at the desired temperature, e. g. 70° F., this reactor being filled with a solid absorbent catalyst carrier such as Porocel. At the lower temperature of the reactor the aluminum chloride is deposited on the carrier. The rate of movement of the liquid reactant through the reactor is adjusted to provide for the desired contact time. The products are passed from the upper portion of the reactor through a stabilizer, where the unreacted isobutane is removed as overhead and recycled for further use. A portion of the bottoms from the stabilizer is recycled to the reactor, in the amount described above, while the portion not recycled is drawn off as the crude reaction product, which may then be further topped in a still (not shown) to produce an oil of the desired properties. In an obvious modification of this process a portion of the entire reaction product containing unreacted isobutane is recycled to the reactor, account being taken of the amount of such recycled isobutane in providing the correct proportions of isobutane and propylene in the fresh feed.

In the following example are shown the data pertaining to the actual conditions employed and the properties of the products formed in a pilot plant run illustrating the present invention. It is to be understood that this example is given merely as one illustration of the process of the present invention and is not to be construed as limiting the scope of the invention in any way.

*Example*

Liquid isobutane was passed through an aluminum chloride saturator at a temperature of 135–150° F., then into a reactor containing Porocel, into which was also introduced a stream of liquid propylene and a stream of recycle liquid products, the reaction taking place at 70° F. The isobutane and propylene were employed in a mol ratio of 5/1, and the volume ratio of recycle products to total new feed was 5/1. The contact time for a single pass was 9 minutes and the operation was conducted at approximately 200 lbs. per sq. in. gauge pressure. The liquid products were recycled after removal of unreacted isobutane by distillation. The portion of total liquid products not recycled to the reactor was drawn off and this product was found to represent a 97% conversion of the propylene employed, and was further fractionated into 10% of a product of the $C_5$ to $C_7$ range and 90% of $C_8+$ material, the latter being a light yellow, viscous oil. The $C_8+$ fraction of the above material was stripped at 200° C. (392° F.) vapor temperature at 0.8 mm. pressure, giving a yield of bottoms equivalent to 65% of the total normally liquid product of the reaction. No discoloration or evidence of cracking was noticed when the oil was subjected to the high temperatures. The inspections on the light yellow viscous oil thus produced are as follows:

| | |
|---|---|
| Flash point, °F | 525 |
| Bromine No., cgs./cc | 9.5 |
| Vis. at 210° F. (S. U. S.) | 412.7 |
| Vis. at 100° F. (S. U. S.) | 23,668 |
| Viscosity index | 59 |
| Slope on ASTM vis./temp. chart | 0.713 |
| Conradson carbon, percent | 0.002 |

The high flash point of the product of the above example is an indication of the stability of the product, and a scope of the ASTM vis./temp. chart and the viscosity index indicate the quality of the oil. The very low Conradson carbon figure shows that the product may be considered as a good synthetic bright stock. While the viscosity of the above oil is too high for use alone as a lubricating oil for most purposes, it is advantageously employed as a blending material to replace the more expensive refined bright stocks now in use, to produce a lubricating oil of good stability.

It will be understood that variations in the properties of the product may be brought about by varying the conditions of the reaction somewhat, since by operating at somewhat higher temperatures a lower viscosity product will be formed. Similarly, a decrease in the contact time will, in general, reduce the molecular weight and viscosity of the product.

What is claimed is:

1. A method of preparing a synthetic hydrocarbon lubricating oil which comprises continuously passing a mixture of 4 to 6 molecular proportions of isobutane and 1 molecular proportion of propylene through a reactor in contact with an aluminum chloride catalyst and simultaneously and continuously recycling a portion of the total normally liquid reaction product to said reactor, the volume ratio of recycled product, exclusive of any unreacted isobutane, to the fresh feed mixture entering the reactor being 4–6/1, while maintaining in the reactor a temperature of 60–90° F. and a pressure sufficient to maintain a liquid phase reaction, and maintaining such a rate of flow through the reactor that the contact time is 5 to 15 minutes.

2. A method according to claim 1 in which the molecular proportion of isobutane to propylene in the fresh feed mixture is 5/1, and in which the volume ratio of recycled product to total fresh feed is 5/1.

3. A method according to claim 2 in which the contact time in the reactor is 9 minutes.

4. A method according to claim 3 in which the temperature in the reactor is 70° F.

5. The method of preparing a synthetic hydrocarbon lubricating oil which comprises passing liquid isobutane through an aluminum chloride saturator at a temperature of 135–150° F. and subsequently into a reactor containing a solid adsorbent catalyst carrier, and simultaneously passing liquid propylene into said reactor in the proportion of 1 molecular proportion to 5 molecular proportions of isobutane, simultaneously recycling to said reactor a portion of the total normally liquid reaction product to said reactor in the proportion of 5 volumes of recycled product to 1 volume of total isobutane-propylene feed, maintaining a temperature in said reactor of 70° F. and a pressure sufficient to maintain a liquid phase reaction, and maintaining such a rate of flow through the reactor that the contact time is about 9 minutes.

6. A method according to claim 5 in which the unreacted isobutane is separated by distillation from the total reaction product before recycling any portion of the reaction product to the reactor, and in which the reaction is conducted under a gauge pressure of 200 lbs. per sq. in.

ROBERT J. FRITZ.

REFERENCES CITED

The following references are of record in the file of this patent:

UNITED STATES PATENTS

| Number | Name | Date |
|---|---|---|
| 2,304,290 | van Peski | Dec. 8, 1942 |
| 2,318,781 | Ipatieff et al. | May 11, 1943 |
| 2,450,174 | Weinrich et al. | Sept. 28, 1948 |
| 2,463,872 | Heinrich | Mar. 8, 1949 |
| 2,469,725 | Heinrich | May 10, 1949 |
| 2,494,510 | Hughes | Jan. 10, 1950 |
| 2,521,939 | Oriolo | Sept. 12, 1950 |